United States Patent
Magown, Sr. et al.

[15] 3,680,890
[45] Aug. 1, 1972

[54] SAFETY LOCK FOR ARTICULATED VEHICLE

[72] Inventors: Lloyd L. Magown, Sr.; Rex L. Zillman, both of Longview, Tex.

[73] Assignee: R. G. Le Tourneau Inc., Longview, Tex.

[22] Filed: July 13, 1970

[21] Appl. No.: 54,394

[52] U.S. Cl. ..................................280/432, 280/474
[51] Int. Cl. ............................................B62d 53/00
[58] Field of Search......................280/432, 474, 445

[56] References Cited

UNITED STATES PATENTS 2,273,410   2/1942   Lux............................280/474 X

FOREIGN PATENTS OR APPLICATIONS 213,990   4/1924   Great Britain................280/432

*Primary Examiner*—Leo Friaglia
*Attorney*—Wofford and Felsman

[57] ABSTRACT

As safety lock for locking a pivot connection of an articulated vehicle for servicing, shipment, and the like, characterized by a sector disc means rigidly affixed to one section of the vehicle with engaging means such as notches or protrusions disposed about its periphery; and a lock member pivotally mounted on the other section of the vehicle and pivotal into a normal position out of contact with the sector disc means, into an armed position, and into a locked position. The operator can pivot the lock member into the armed position, where the lock member is in interference with the sector disc so as to be drawn into the locked position upon further steering in a predetermined direction. The operator may then operate from the operator's console the steering switch to effect the locked position, in which the lock member engages at least one of the engaging means in the sector disc. Also disclosed are specific preferred embodiments in which the lock member is movable in a plane parallel with the plane of the sector disc and has a holding pin for holding its free end in either the normal position or the locked position.

5 Claims, 5 Drawing Figures

PATENTED AUG 1 1972 3,680,890
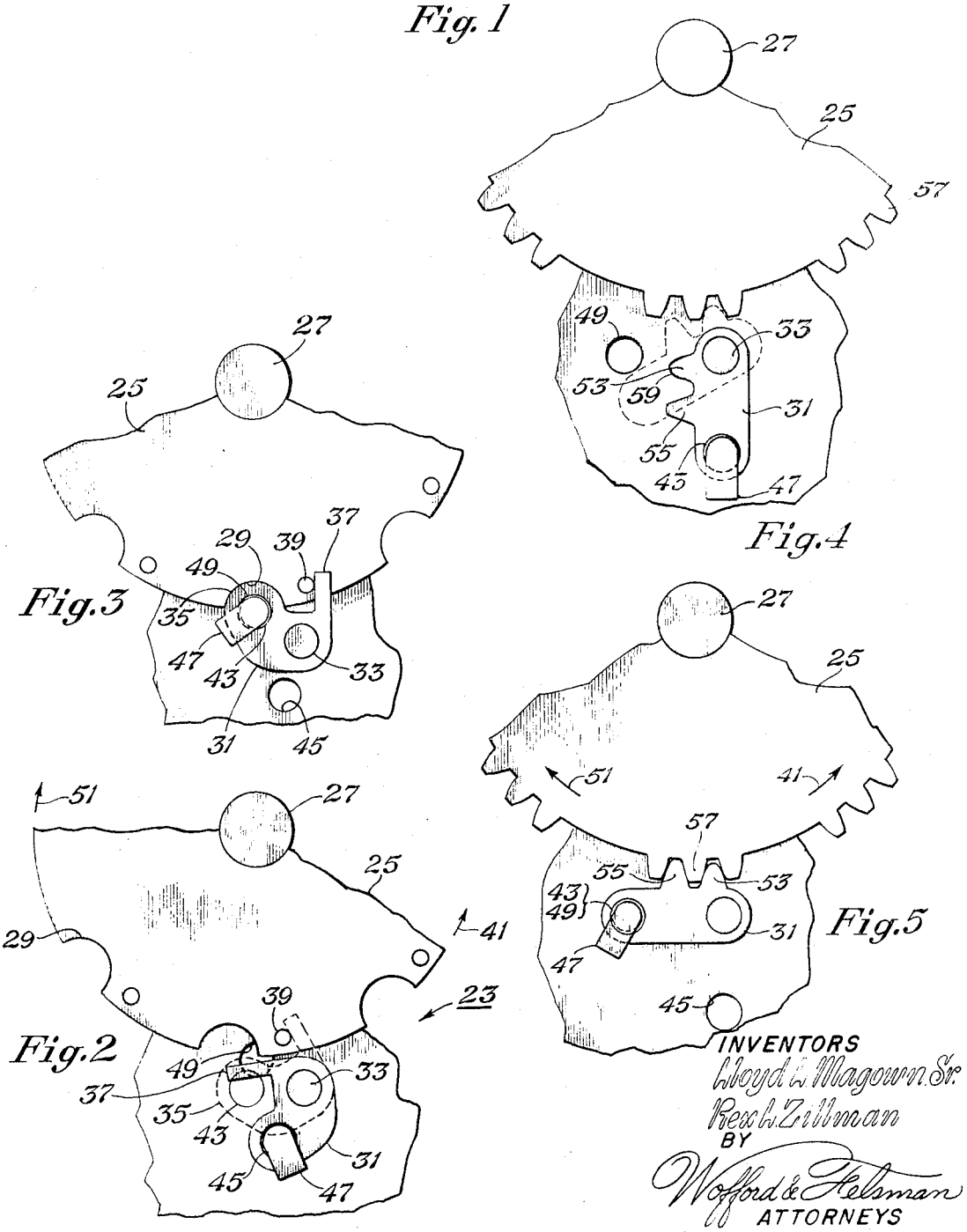
INVENTORS
Lloyd L. Magown, Sr.
Rex L. Zillman
BY
Wofford & Felsman
ATTORNEYS

SAFETY LOCK FOR ARTICULATED VEHICLE

BACKGROUND OF THE INVENTION

1. Field of the Invention

This invention relates to pivot connection between articulated vehicles such as the large earth-moving vehicles. More particularly, it relates to a safety lock for locking the sections of the articulated vehicle together to prevent movement and injury to personnel.

2. Description of the Prior Art

It is known in the prior art to employ articulated vehicles having a steering means for moving the sections with respect to each other about a pivot connection therebetween. Heretofore, when the power steering means has been deactivated, the pivot joint has been freely pivotable and it has been up to the workmen to either stay out of the way of the immense frames or to individually improvise precautionary safety measures. Such safety measures have included inserting hydraulic jacks under the respective sections or between the sections of the vehicle to prevent the dangerous movement about the pivot connection. Also, such safety measures have included drilling a hole to align with the space between teeth on a steering sector gear, through a member on the section of the vehicle opposite the steering sector gear and inserting a pin to prevent the pivotal movement. To make the insertion, the operator had to operate the steering switch, or mechanism, to effect the necessary alignment, and a second workman had to watch and insert the pin when the aperture and the space between the teeth were properly aligned so that the pin could be emplaced. Such a cumbersome arrangement has required the services of two workmen; one of whom was frequently unavailable, making the clambering back and forth by the operator to steer a little and check alignment too time consuming. Moreover, the pin frequently would be lost or not readily available, since it could not be stored in the hole for normal operation making the locking impractical. Consequently, the workmen frequently left the vehicles unlocked; with the hazards noted hereinbefore.

Thus, insofar as we are aware, the safety locks provided by the prior art machines have not been satisfactory, since they are subject to the same general type disadvantages described hereinbefore.

BRIEF DESCRIPTION OF THE DRAWINGS

FIG. 1 is a side elevational view of a typical articulated vehicle employing an embodiment of this invention.

FIG. 2 is a partial plan view showing one embodiment of this invention in the normal position; and, in ghost lines, in the armed position; and FIG. 3 shows the same embodiment in the locked position.

FIG. 4 shows another embodiment of this invention in the normal position; and, in ghost lines, in the armed position; and FIG. 5 shows the same embodiment in the locked position.

DESCRIPTION OF THE PREFERRED EMBODIMENTS

It is a primary object of this invention to provide a safety lock for locking the pivot connection between sections of an articulated vehicle, the lock being operable by only the operator of the vehicle without requiring the presence of an additional workman.

Referring to FIG. 1, the present invention is shown incorporated in an articulated vehicle 11 having a front section 13 and a rear section 15. Front section 13 has a pair of front wheels 17. Rear section 15 has a pair of rear wheels 19. The front and rear sections 13 and 15 are pivotally connected via pivot connection 21 for horizontal steering movement relative to one another about a vertical axis. Specifically, a conventional steering motor rotates a small steering gear on one section with respect to an engaging sector gear on the opposite section in response to a steering switch in the operator's console. Alternatively, a hydraulic cylinder, piston and shaft arrangement between the front and rear sections on one or both sides of the pivot connection effect the desired degree of steering in response to the steer switch in the operator's console. the A safety lock 23 is provided for locking the articulated vehicle in a predetermined position; for example, for preventing movement due to untimely or inadvertent operation of the steering mechanism; for servicing of the vehicle; or for shipment of the vehicle. Referring to FIG. 2, the safety lock 23 comprises a sector disc means such as sector disc 25 that is rigidly affixed to one section of the articulated vehicle. For example, sector disc means 25 may be rigidly affixed to the rear section 15 of the articulated vehicle 11. The sector disc 25 has an engaging means such as a notch means or a protrusion means disposed on its periphery. As illustrated, and preferably, sector disc 25 has its center aligned with the axis 27 of the pivot connection 21, is circular, and has a plurality of notches, or indentations 29 disposed about its circumference. The plurality of engaging means makes feasible the steering of the sections of the vehicle to a desired position, or degree of steer, before locking the sections together to prevent movement.

A lock member 31 is pivotally mounted on the other section such as the front section of the articulated vehicle 11. The lock member 31 is mounted for pivotal movement about a shaft 33 into its normal position; into its armed position, indicated by ghost lines; and into its locked position, as illustrated in FIG. 3. The lock member 31 has a rounded terminal locking portion 35 for conformingly engaging the individual indentation 29 of the sector disc in the locked position. The lock member 31 also has an eccentric arming portion such as arm 37 for pivoting the lock member 31 from its armed position to its locked position in response to alignment with one of the indentations. As can be seen, when the lock member 31 is in the normal position, it allows free movement of the sector disc 25.

The sector disc 25 has a pin means such as pin 39 disposed near its periphery at a predetermined distance from a respective indentation. The pin 39 defines a circular path of travel as sector disc 25 is rotated. The lock member 31 is mounted for pivotal movement in a plane parallel with the plane of the sector disc 25. Its arm 37 is rigidly affixed thereto at a distance with respect to the rounded terminal locking portion that is correlative with the predetermined distance of the pin 39 with respect to the adjacent indentation 29 so as to allow a conforming engagement between the indentation and the locking portion. When the lock member 31 is pivoted to the armed position, arm 37 extends to within the circular path of travel such that it will encounter pin 39 upon proper rotation of the sector disc 25. A further slight rotation in the direction indicated by arrow 41 will effect further pivotal movement of the lock member such that the rounded terminal portion 35 engages the indentation 29, as illustrated in FIG. 3. This position is the locked position.

A normal holding means is provided for retaining the lock member 31 in the normal position. Similarly, a locked holding means is provided for retaining the lock member in the locked position. Specifically, a pin aperture 43 is provided in the free end of the lock member for allowing the passage of a holding pin therethrough. A normal holding aperture 45 is provided in the other section of the articulated vehicle so as to match the pin aperture 43 when the lock member 31 is in the normal position. A holding pin means 47 is insertable through the pin aperture 43 and into the normal holding aperture 45 for retaining the lock member 31 in the normal position.

Similarly, a locked aperture 49 is provided in the other section of the articulated vehicle so as to match the pin aperture 43 in the lock member 31 when the lock member is in the locked position. The holding pin 47 is insertable through the pin aperture 43 in the lock member 31 and into the matching locked aperture 49 for holding the lock member 31 in the locked position.

In operation, the operator of the vehicle removes the lock pin 47 from pin aperture 43 and normal holding aperture 45. He then pivots the lock member 31 such that arm 37 protrudes within the circle of travel of the next pin 39 and returns to the operator's console. He moves the steer switch so as to effect movement of sector disc 25 in the direction of the arrow 41. The pin 39 contacts arm 37, and pivots the lock member 31 into the locked position. In the locked position, as illustrated in FIG. 3, the rounded terminal locking portion 35 conformingly engages the indentation 29 in the locked position. Moreover, the pin aperture 43 is aligned with the locked holding aperture 49. Accordingly, the operator may insert holding pin 47 through the pin aperture 43 and into the locked holding aperture 49.

Conversely, when it is desired to unlock the vehicle, the operator removes the holding pin 47 from the pin aperture 43 and the locked holding aperture 49; and moves the steer switch to move the sector disc 25 in the direction indicated by arrow 51. After pin 39 has cleared arm 37, lock member 31 may be pivoted to the normal position and pin 47 inserted through the respective matching apertures, as illustrated in FIG. 2.

Another embodiment is illustrated in FIGS. 4 and 5. Therein, the sector disc 25 has at least one tooth on its periphery; and, preferably, has its center aligned with the axis 27 of the pivot connection 21, is circular, and has a plurality of teeth about its periphery. The lock member 31 is mounted for pivotal movement about shaft 33 in a plane parallel to the plane of sector disc 25 in this embodiment, also. Lock member 31 has, as a locking portion, tooth 53. As illustrated, lock member 31 has a plurality of locking teeth 53 and 55. The locking teeth 53 and 55 conformingly engage the teeth 57 on the sector disc 25. The lock member 31 has a tooth tip 59 serving as its eccentric arming portion for being moved intermediate the teeth 57. The tooth tip 59 thus interferingly engages the teeth 57 when lock member 31 is in the armed position; and, when sector disc 25 is rotated in the direction indicated by the arrow 41, serves to pivot the lock member 31 from the armed position to the locked position, as illustrated in FIG. 5.

In operation, the operator withdraws the holding pin 47 from the pin aperture 43 and the normal holding aperture 45 and pivots the lock member 31 into the armed position such that the tooth tip 59 will engage the teeth 57. He then returns to the operator's console and actuates the steer switch to move sector disc 25 in the direction indicated by arrow 41. The teeth 57 engage the tooth tip 59 and pivot the lock member 31 into the locked position. In the locked position, as illustrated in FIG. 5, the locking teeth 53 and 55 conformingly engage the teeth 57 and prevent relative movement of the sections of the vehicle with respect to each other. The operator then returns to insert the holding pin 47 through the pin aperture 43 and into the matching locked holding aperture 49 in the other section of the articulated vehicle. Thus the vehicle is locked and may be shipped or repaired without movement about the pivot connection.

Conversely, when it is desired to release the safety lock, the operator pulls the pin 47 from pin aperture 43 and locked holding aperture 49. He then returns to the operator's console and actuates the steer switch so as to steer sector disc 25 in the direction indicated by arrow 51, effecting pivotal movement of lock member 31 into the normal position, as illustrated in FIG. 4. The operator may then manually pivot the lock member 31 to effect the alignment of pin aperture 43 and normal holding aperture 45 and insert pin 47 into the aligned apertures.

The sector disc means must, of course, be designed to sustain the force tending to induce movement about the pivot connection. The sector disc means may be a part of the vehicle frame, may be a separate disc that is rigidly affixed to one section of the vehicle frame, or it may be the actual steering sector gear or attached to the steering sector gear. For example, in the embodiment illustrated in FIGS. 4 and 5, the lock member 31 may be mounted adjacent to the steering sector gear so as to engage and lock the steering sector gear. The appropriate holding apertures are then formed in the section of the vehicle to which the steering sector gear is not rigidly affixed. In this way, the expense of mounting a separate disc means is obviated.

The embodiments have been described with respect to having the sector disc 25 connected with the rear section of the articulated vehicle. Alternatively, the sector disc 25 may be rigidly connected with the front section of the vehicle. The holding pin 47 may be a piece of bar stock having a 90° bend therein. On the other hand, it may be of a more elaborate structure, including a tapered lower end. If desired, a plurality of holding pins may be employed, one in each of the holding apertures.

The materials of construction ordinarily employed in the large earth-moving equipment or whatever vehicle employs articulated steering about a pivot connection, may be employed in effecting the safety lock.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. A safety lock for locking a pivot connection of an articulated vehicle comprising:
   a. a circular sector disc means that is rigidly affixed to one section of said articulated vehicle and has its center aligned with the axis of said pivot connection;
   b. at least one engaging means disposed about the periphery of said sector disc means;
   c. a lock member pivotally mounted on the other section of said articulated vehicle for movement in a plane that is parallel with the plane of said sector disc means and pivotal into a normal position, into an armed position, and into a locked position; said lock member having a locking portion for conformingly engaging said engaging means of said sector disc means in said locked position, an eccentric arming portion engagable by said sector disc means for automatically pivoting said lock member from its armed position to its locked position in response to pivotal movement of said sector disc means to effect alignment with said engaging means; said lock member allowing, when positioned in said normal position, free movement of said sector disc means, the length of said lock member being less than the length of the radius of said sector disc means and the shortest distance from the pivot axis of said lock member to the periphery of said sector disc means being less than the greatest width of said lock member;
   d. normal holding means for retaining said lock member in said normal position; and
   e. locked holding means for retaining said lock member in said locked position.

2. The safety lock of claim 1 wherein said engaging means is an arcuate notch means and said locking portion is a rounded terminal portion to conformingly fit said arcuate notch means.

3. The safety lock of claim 2 wherein said sector disc means has a laterally extending protrusion means defining a circular path of travel when said sector disc means is rotated and disposed near its periphery at a predetermined distance from a respective arcuate notch means; said eccentric arming portion comprises an arm rigidly fixed to said lock member at a distance with respect to said rounded terminal locking portion that is correlative with said predetermined distance; said arm being disposed so as to be outside the circular path of travel of said protrusion means in said normal position, within said circular path of travel in said armed position, and operable to engage said protrusion means to effect pivoting of said lock member into said locked position in response to rotation of said sector disc means in a predetermined direction.

4. The safety lock of claim 2 wherein said respective holding means comprise a first pin aperture in said lock member, a second pin aperture in said other section disposed so as to match said first pin aperture when said lock member is in said locked position; and a holding pin means insertable through said apertures; said second pin aperture being disposed so that the holding pin means is partially within said arcuate notch means when in the locked position.

5. The safety lock of claim 1 wherein said engaging means is a radially extending protrusion means and said locking portion is shaped to conformingly fit said protrusion means.

* * * * *